US010173304B2

(12) United States Patent
Christofilis et al.

(10) Patent No.: US 10,173,304 B2
(45) Date of Patent: Jan. 8, 2019

(54) CLAMPING APPARATUS FOR ELONGATED SHAPES

(71) Applicant: Intelligent Processes and Automation Inc., Addison, IL (US)

(72) Inventors: Tom Christofilis, Oakbrook Terrace, IL (US); Artur Trzebunia, Gilberts, IL (US)

(73) Assignee: INTELLIGENT PROCESSES AND AUTOMATION INC., Addison, IL (US)

( * ) Notice: Subject to any disclaimer, the term of this patent is extended or adjusted under 35 U.S.C. 154(b) by 47 days.

(21) Appl. No.: 15/138,599

(22) Filed: Apr. 26, 2016

(65) Prior Publication Data

US 2016/0311086 A1 Oct. 27, 2016

Related U.S. Application Data

(60) Provisional application No. 62/152,944, filed on Apr. 26, 2015.

(51) Int. Cl.
  *B25B 5/00* (2006.01)
  *B25B 5/08* (2006.01)
  *F16B 2/18* (2006.01)
  *B21D 7/16* (2006.01)
  *B21D 7/024* (2006.01)

(52) U.S. Cl.
  CPC .................. *B25B 5/08* (2013.01); *B21D 7/16* (2013.01); *F16B 2/18* (2013.01); *B21D 7/024* (2013.01)

(58) Field of Classification Search
  CPC .......... B23B 31/1612; B23B 31/16125; B23B 31/1615; B25B 13/18; B25B 13/44; B25B 13/5075; B25B 5/147
  See application file for complete search history.

(56) References Cited

U.S. PATENT DOCUMENTS

| 877,773 A | * | 1/1908 | Holm | B25B 13/44 |
| | | | | 269/109 |
| 1,488,221 A | * | 3/1924 | Swissgabel | B23B 31/16004 |
| | | | | 269/104 |
| 2,305,624 A | * | 12/1942 | Lange | E21B 19/164 |
| | | | | 81/57.18 |
| 2,550,045 A | * | 4/1951 | De Hetre | E21B 19/164 |
| | | | | 279/110 |

(Continued)

*Primary Examiner* — Tyrone V Hall, Jr.
(74) *Attorney, Agent, or Firm* — Neal, Gerber & Eisenberg LLP (57) ABSTRACT

Embodiments include a clamping apparatus comprising a pair of adjustable anvils configured to apply a clamping pressure on a workpiece secured between the anvils; a center gear comprising a pair of anvil holders respectively coupled to the pair of anvils; an open center configured to receive the workpiece, the anvils being positioned within said open center; and a pair of outer gears arranged on either side of the center gear, the outer gears being configured to rotate about the open center. Rotation of the outer gears causes a linear movement of the anvils along an axis perpendicular to workpiece. Embodiments also includes a clamping system comprising the clamping apparatus, as well as a positioning device for driving the center gear based on a positioning input and a clamping device for driving the outer gears based on a clamping input.

11 Claims, 7 Drawing Sheets

(56) References Cited

U.S. PATENT DOCUMENTS

| | | | | |
|---|---|---|---|---|
| 3,589,742 A * | 6/1971 | Flick | ............... | E21B 19/164 269/235 |
| 4,215,602 A * | 8/1980 | Carstensen | ......... | E21B 19/164 81/57.18 |
| 4,273,010 A * | 6/1981 | Farr | ............... | E21B 19/164 81/57.18 |
| 4,623,191 A * | 11/1986 | Blume | ............. | B62D 17/00 188/75 |
| 5,207,128 A * | 5/1993 | Albright | .......... | E21B 19/164 81/57.14 |
| 9,010,219 B2 * | 4/2015 | Feigel, Jr. | ......... | E21B 19/164 81/57.15 |
| 2005/0011312 A1 * | 1/2005 | Mardian | ........... | E21B 19/164 81/57.18 |
| 2014/0345426 A1 * | 11/2014 | Rosano | ............ | E21B 19/164 81/57.18 |

\* cited by examiner

CLAMPING APPARATUS FOR ELONGATED SHAPES

CROSS-REFERENCE TO RELATED PATENT APPLICATIONS

This application claims priority to U.S. Provisional Patent Application No. 62/152,944 filed Apr. 26, 2015, the entire content of which is incorporated by reference herein.

BACKGROUND OF THE INVENTION

The description that follows relates to a clamping apparatus found in clamping systems and/or in machines for bending wires, rods, tubes, and the like.

Bending machines for wires, tubes, rods, and the like include one or more clamps for holding a work piece in place during a bending operation. Existing bending machines use pneumatic, mechanical, or hydraulic processes to perform said clamping and have several drawbacks. For example, hydraulic clamps can rotate a work piece only so far as the clamp allows (e.g., up to 270 degrees) due to the location of the hydraulic tube relative to the clamp. While mechanical clamps may be capable of rotating the work piece infinitely around 360 degrees, they have other drawbacks. For example, a typical mechanical clamp can only apply a limited amount of pressure to the work piece and can only clamp and unclamp the work piece at a certain preset position (e.g., a starting location). Further, mechanical clamps typically include a spring to preload an anvil to the work piece upon insertion and often include a fixed upper and/or lower anvil that may need to be removed in order to accommodate different material thicknesses or profiles. As a result, the clamping pressure of such clamps can only be mechanically applied and adjusted. Also, most existing clamps can be difficult to use with elongated pieces (e.g., seven or more feet long) or other work pieces that hard to hold and handle.

SUMMARY OF THE INVENTION

The invention is intended to solve the above-noted problems by providing, among other things, (1) a clamping apparatus having finely adjustable anvils configured to receive a cylindrical, rectangular, or profiled rod, or other work piece, and an open center for easy loading of an elongated work piece and to allow infinite axial rotation of the same; and (2) a clamping system comprising the clamping apparatus, a positioning servo motor for positioning the work piece, and a clamping servo motor for applying a clamp pressure to a work piece inserted into the clamping apparatus (e.g., between two anvils).

For example, one embodiment includes a clamping apparatus comprising a generally annular body including an open center configured to receive a workpiece. The annular body includes a pair of anvils configured to exert a clamping pressure on the workpiece; a center gear comprising at least one adjustable anvil holder coupled to at least one of the anvils; at least one pin rotatably coupled to the at least one anvil holder, the at least one pin extending perpendicularly from the center gear; and a pair of outer gears positioned on either side of the center gear, each of the outer gears comprising at least one slot configured to slidably receive a respective end of the at least one pin.

Another example embodiment includes a clamping apparatus comprising a pair of adjustable anvils configured to apply a clamping pressure on a workpiece secured between the anvils; a center gear comprising a pair of anvil holders respectively coupled to the pair of anvils; a pair of outer gears arranged on either side of the center gear, rotation of the outer gears relative to the center gear causing a linear movement of the anvils along an axis perpendicular to the workpiece; and an open center extending through each of the outer gears and the center gear and configured to receive the workpiece, the anvils being positioned within said open center.

Another example embodiment includes a clamping system comprising a clamping apparatus having a generally annular body with an open center configured to receive a workpiece. The clamping apparatus includes a pair of adjustable anvils positioned within the open center and configured to apply a clamping pressure on the workpiece, a center gear comprising a pair of anvil holders respectively coupled to the pair of anvils, and a pair of outer gears arranged on either side of the center gear and configured to rotate relative to the center gear so as to cause a linear movement of the anvils along an axis perpendicular to the workpiece. The clamping system further includes a positioning device configured to drive the center gear based on a positioning input, the positioning input determining a position of the workpiece within the open center; and a clamping device configured to drive the outer gears based on a clamping input, the clamping input determining an amount of torque applied to the outer gears.

A better understanding of the invention will be obtained from the following detailed descriptions and accompanying drawings, which set forth illustrative embodiments that are indicative of the various ways in which the principals of the invention may be employed.

Illustrative and exemplary embodiments of the invention are described in further detail below with reference to and in conjunction with the figures.

DETAILED DESCRIPTION

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 1:
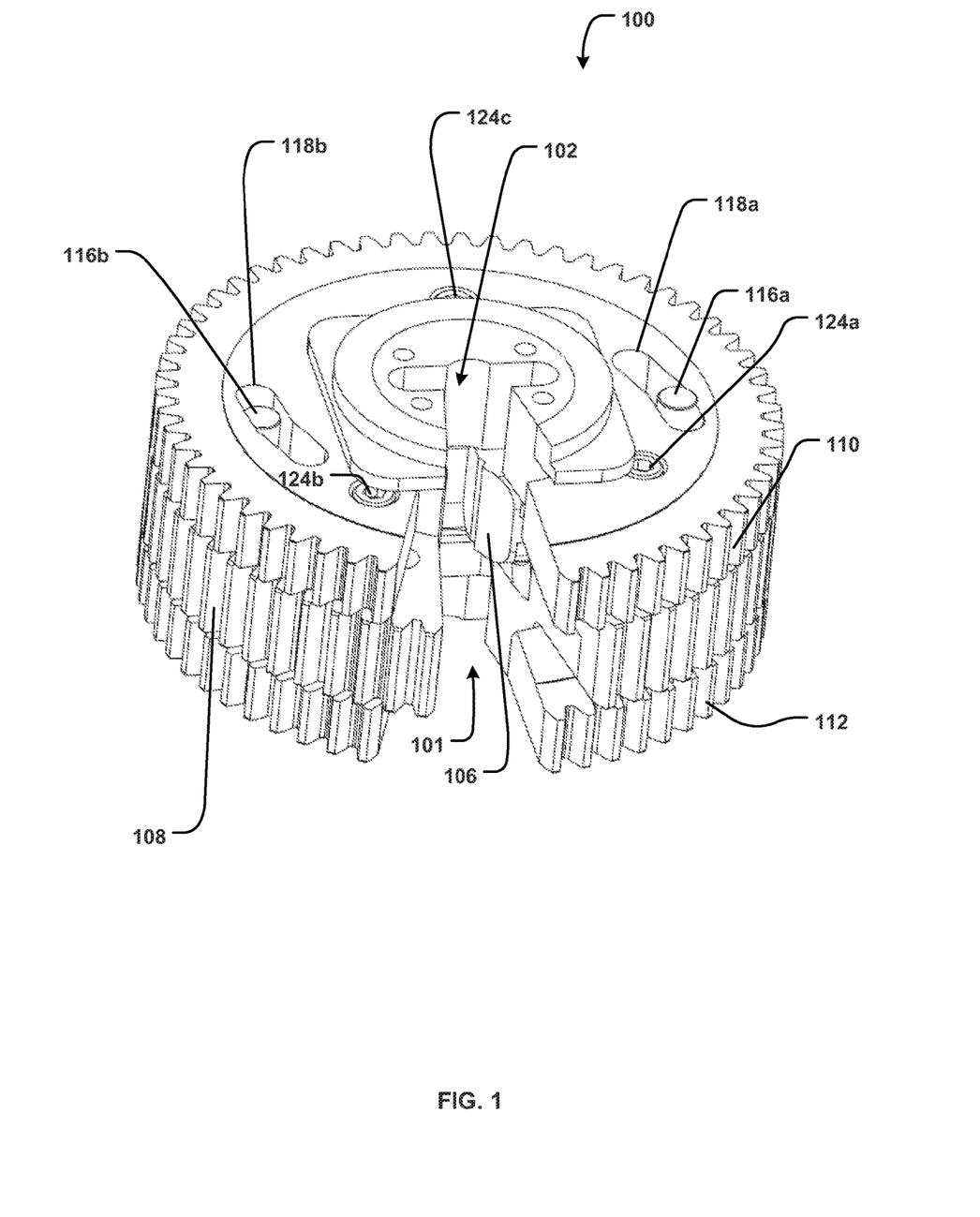
FIG. 1 is a top perspective view of an example clamping apparatus in accordance with certain embodiments.
Figure 2:
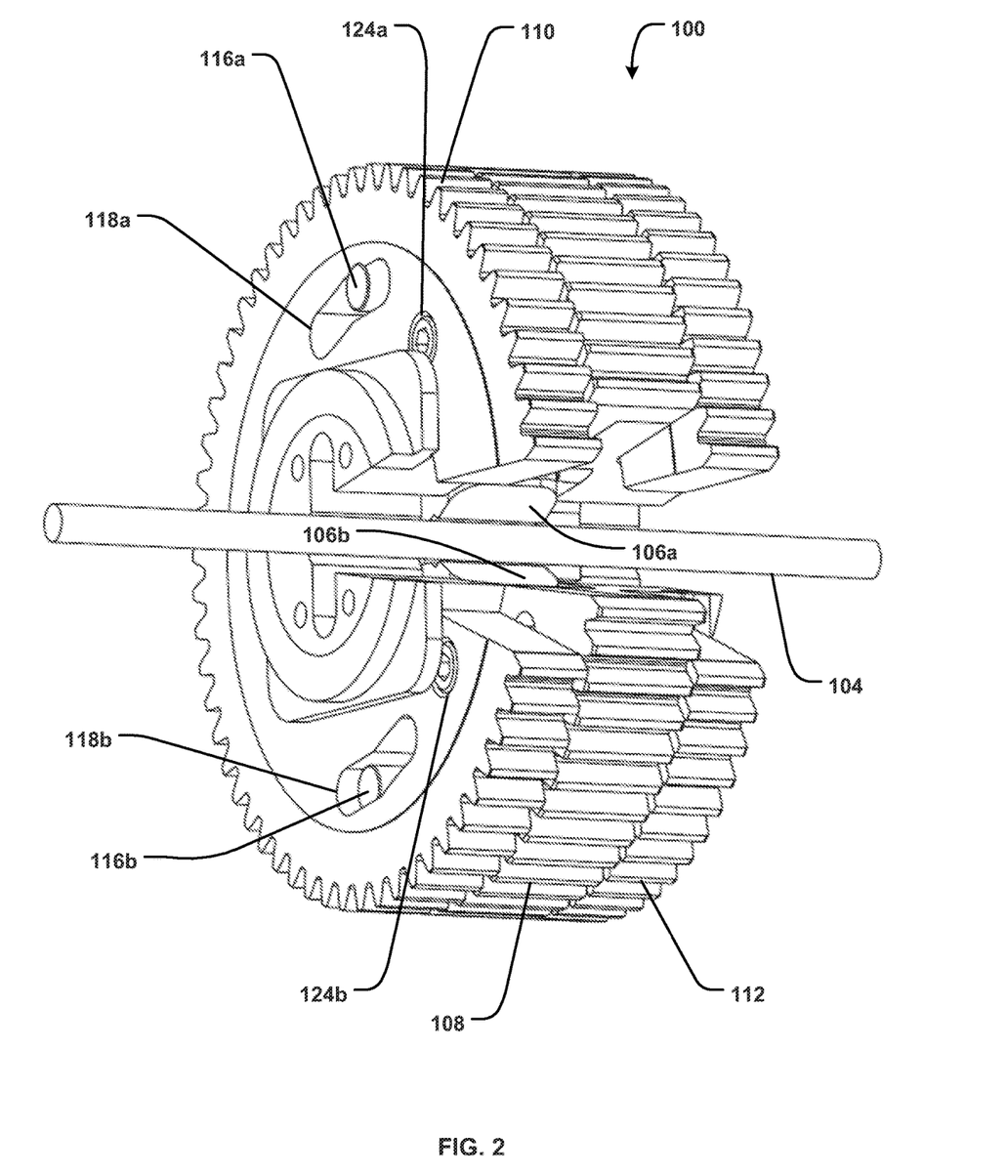
FIG. 2 is a perspective view of the clamping apparatus shown in FIG. 1 rotated onto one side and holding a work piece, in accordance with certain embodiments.
Figure 3:
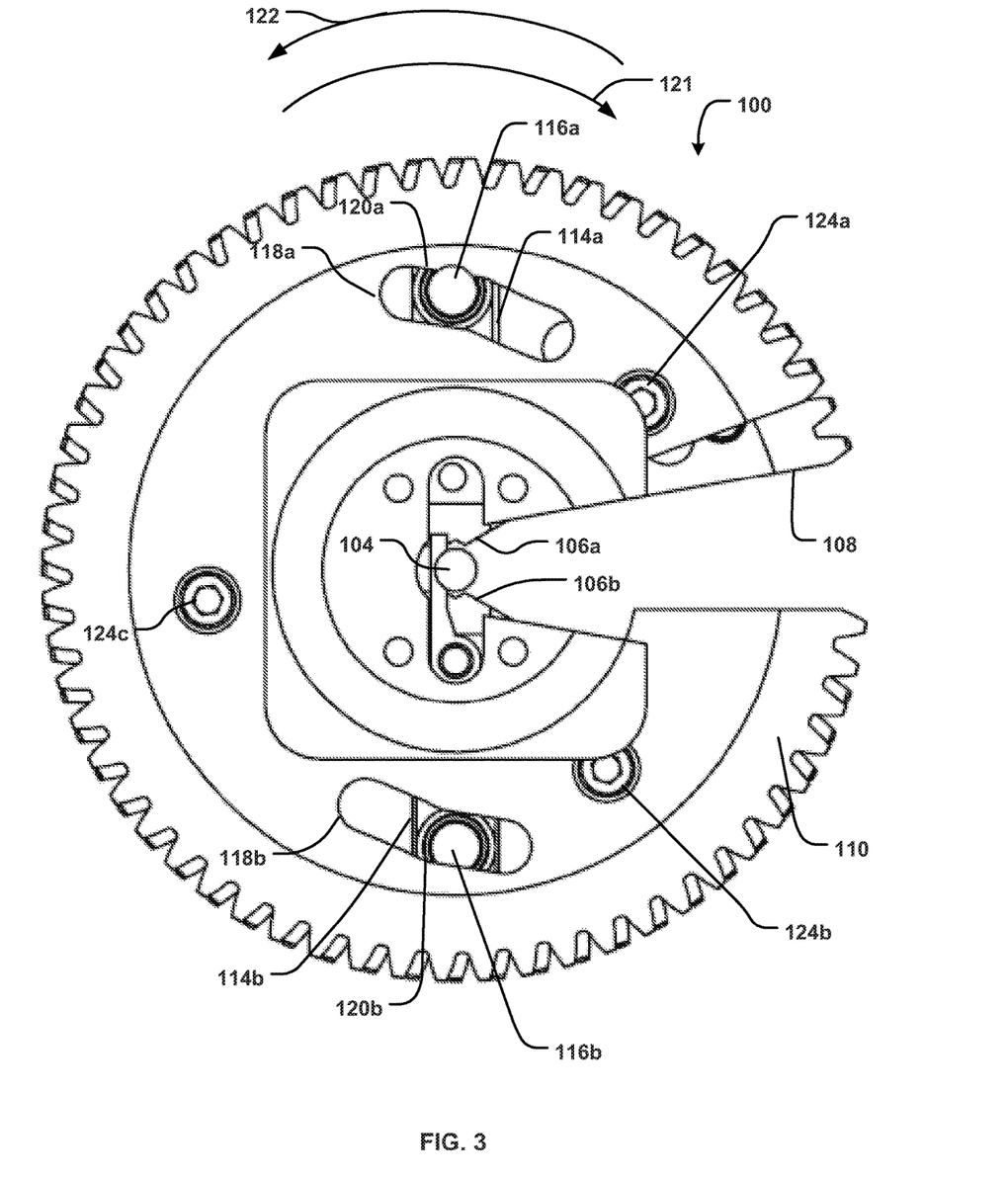
FIG. 3 is a top plan view of the clamping apparatus shown in FIG. 2 in accordance with certain embodiments.

FIGS. 1-6 depict an exemplary clamping apparatus 100 in accordance with embodiments. As shown in FIG. 1, the clamping apparatus 100 has a generally annular disk-like body with a triangular opening 101 on one side of the disk. The triangular opening 101 allows easy access to an open center 102 for receiving a workpiece 104, such as, for example, metal tubing, wire, rod, or the like, and in particular, radially positioning elongated workpieces (e.g., seven feet long). As shown in FIG. 2, the open center 102 extends through the entire clamping apparatus 100 (e.g., from one end of the apparatus 100 to an opposing end), such that the workpiece 104 can be loaded or inserted into either end of the open center 102. The open center 102 also allows infinite or uninterrupted rotation of the workpiece 104, at least with respect to the clamping apparatus 100, which does not include any parts that interfere with or cross over the open center 102. Further, the open center 102 enables the clamping apparatus 100 to receive and/or release the workpiece 104 while in any position (e.g., 0 degrees relative to center, 100 degrees relative to center, etc.).

As shown in FIG. 2, the clamping apparatus 100 further includes one or more anvils 106 for holding the workpiece 104 in place. In the illustrated embodiment, the one or more anvils 106 includes a first anvil 106a positioned in the open center 102 to receive a first side of the workpiece 104 and a second anvil 106b positioned in the open center 102 to receive a second side of the workpiece 104. A distance between the anvils 106a, 106b can be adjusted to accommodate workpieces having a wide range of material thicknesses and profiles (e.g., square, rectangular, circular, hemispherical, polygonal, and others).

In some embodiments, the anvils 106 are configured for symmetrical adjustments where, for example, the anvils 106a, 106b move away from, or towards, each other in tandem. In other embodiments, the anvils 106 can be configured for nonsymmetrical adjustments, for example, to accommodate workpieces with a non-symmetrical profile. In such cases, each of the anvils 106a, 106b may be independently moved to accommodate, for example, the irregular sides of a profiled workpiece 104. Alternatively, one of the anvils 106a/106b may remain fixed while the other of the anvils 106b/106a is adjusted to accommodate the workpiece profile.

Figure 4:
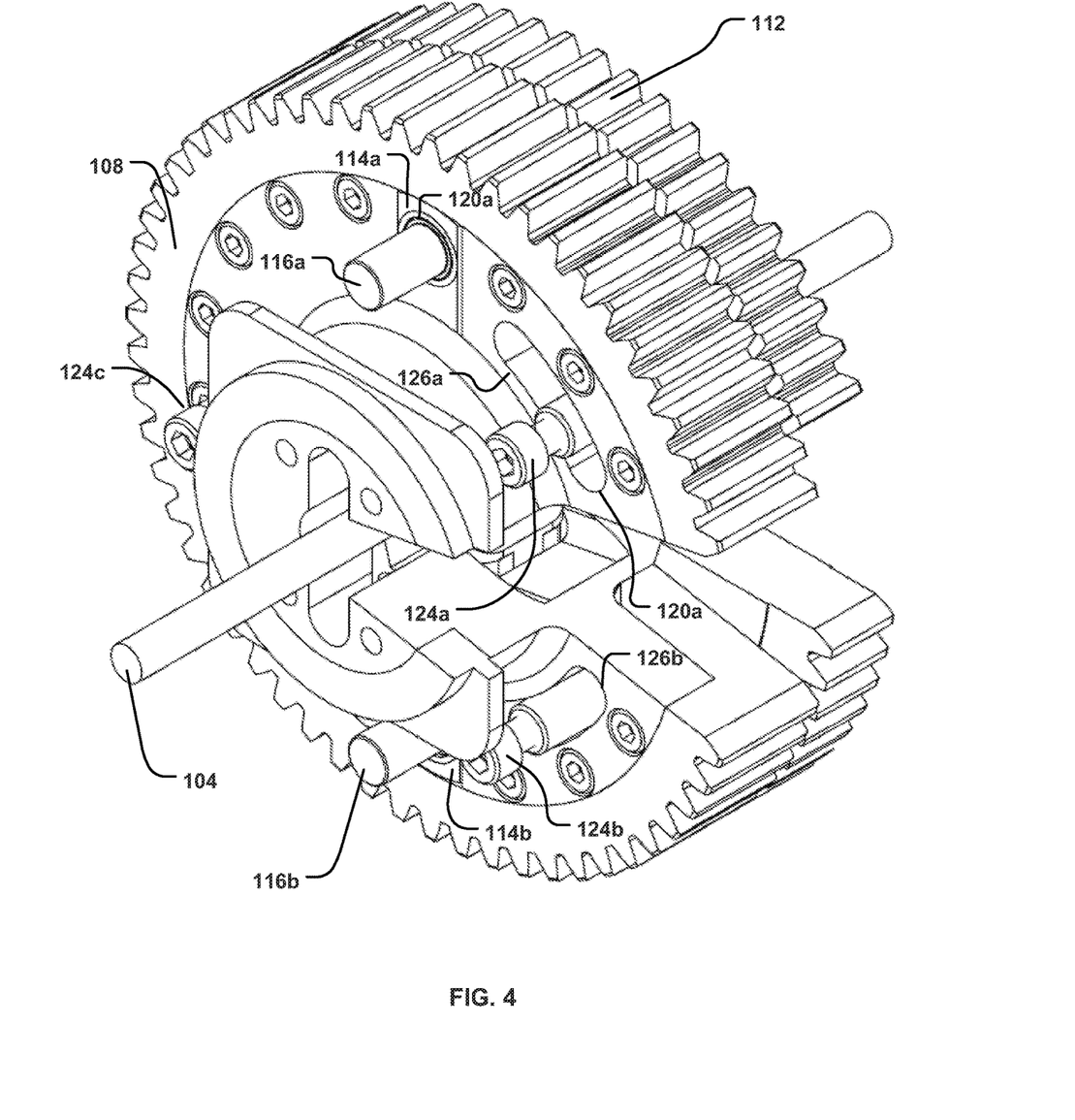
FIG. 4 is a perspective view of the clamping apparatus shown in FIG. 2 with a first gear removed, in accordance with embodiments.

The clamping apparatus 100 further includes a center gear 108 for positioning and centering the workpiece 104 within the open center 102 and a pair of outer gears 110, 112 arranged on either side of the center gear 108 and configured to control a clamping of the workpiece 104 by the anvil(s) 106. In FIG. 4, the outer gear 110 has been removed to show the center gear 108 and other inner components of the clamping apparatus 100 more clearly. The anvil(s) 106 are coupled to, or formed from, the center gear 108, and the center gear 108 can include one or more anvil holders 114 that are configured to move the one or more anvils 106 vertically, or along a central axis perpendicular to the workpiece 104, as shown by arrows 115 in the cross-sectional view provided by FIG. 6. During a clamping or unclamping operation, the outer gears 110, 112 rotate in order to cause linear movement of the anvils 106 relative to the workpiece 104 (e.g., in order to clamp or unclamp the workpiece), and the center gear 108 remains fixed in place to keep the workpiece 104 centered and in position. At other times (e.g., once the clamping operation is complete), all three of the gears 108, 110, 112 may be rotated together, for example, to complete a bending operation of the workpiece 104.

Figures 5, 6:
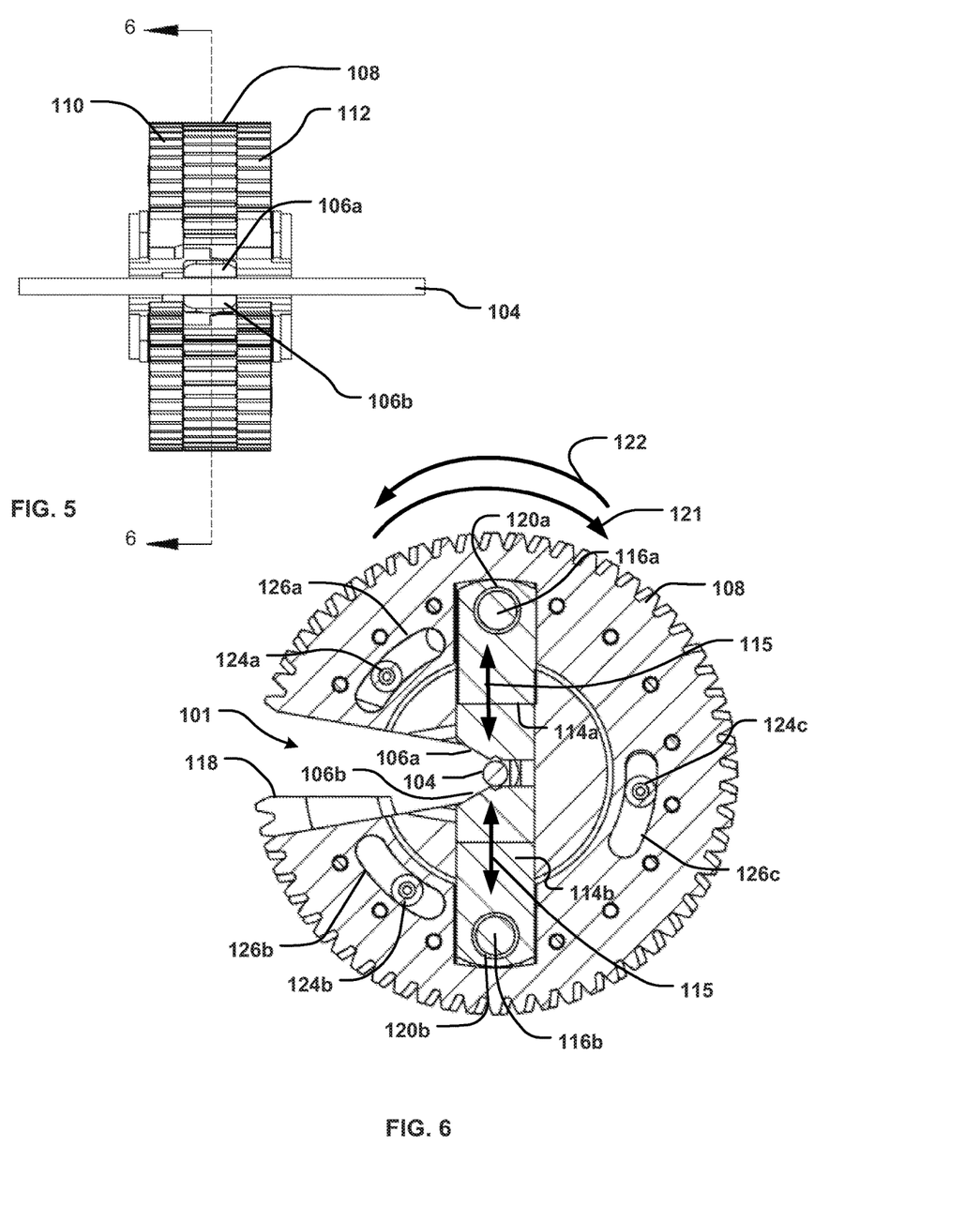
FIG. 5 is a side view of the clamping apparatus shown in FIG. 2 in accordance with embodiments.
FIG. 6 is a cross-sectional view of the clamping apparatus shown in FIG. 5 in accordance with embodiments.

In embodiments, the clamping apparatus 100 includes a drive mechanism for transferring a rotation of the outer gears 110, 112 to the anvil holders 106 of the central gear 108 in order to linearly move the anvils 106 to a position that applies an appropriate amount of clamping pressure on the workpiece 104. For example, the drive mechanism can include shafts 116 slidably engaged to slots 118 to drive a cam profile capable of generating a loading sufficient to clamp the workpiece 104 using the anvils 106a, 106b. As illustrated, one end of shafts 116a, 116b (also referred to herein as "pressure pins") can be respectively coupled to, and/or extend from, the anvil holders 114a, 114b of the center gear 108, and the other end of shafts 116a, 116b can be received by, or inserted into, slots 118a, 118b, respectively. Slots 118a, 118b can be elongated openings formed in at least one of the outer gears 110, 112 and can have a size and shape that is configured to slidably receive the pressure pins 116a, 116b. Further, slots 118 can have a continuous, outer edge that is configured to form the cam profile for guiding the pressure pins 116a, 116b to different positions and/or heights as the outer gears 110, 112 rotate. As shown in FIG. 6, the anvil holders 114a, 114b can include bearing bushings 120a, 120b, respectively, which are rotatably coupled to the pressure pins 116a, 116b to enable rotation of the pins 116a, 116b along the cam profile.

During operation of the clamping apparatus, the anvil holders 114a, 114b move vertically (e.g., along arrows 115) in response to the pressure pins 116a, 116b being slid along the cam profile to a new position within the slots 118a, 118b. In embodiments, a clamp stroke and force of the clamping apparatus 100 can be distinguished by the clamp profile of the slots 118, as well as the torque applied to the outer gears 110, 112 during rotation. Further, the position of the pressure pins 116a, 116b within the slots 118a, 118b can determine the distance between the anvils 106a, 106b and thereby, the clamping pressure applied to the workpiece 104.

For example, when the outer gears 110, 112 rotate in a first direction 121, the pressure pins 116a, 116b move or slide towards a higher position relative to the open center 102. This lifting movement of the pressure pins 116a, 116b causes the anvil holders 114a, 114b to be pulled further apart vertically (e.g., along the arrows 115). Thus, the outer gears 110, 112 may be moved in the first direction 121 during an unclamping operation, when increasing the distance between the anvils 106 to insert, for example, a thicker diameter workpiece, and/or otherwise decreasing the load or clamping pressure on the workpiece 104. Likewise, when the outer gears 110, 112 rotate in a second direction 122, the pressure pins 116a, 116b move or slide towards a lower position relative to the open center 102. This dropping movement of the pressure pins 116a, 116b causes the anvil holders 114a, 114b to be pushed closer together vertically (e.g., along the arrows 115). Thus, the outer gears 110, 112 may be moved in the direction 122 during a clamping operation, when decreasing the distance between the anvils 106 in order to secure, for example, a thinner diameter workpiece, and/or otherwise increasing the load or clamping pressure on the workpiece 104.

Thus, the drive mechanism can adjust the anvils 106 by enabling rotation of the outer gears 110, 112 to cause a sliding movement of the pressure pins 116, which in turn causes linear movement of the anvil holders 114 that carry the anvils 106. In a preferred embodiment, each of the outer gears 110, 112 includes the slots 118 for slidably receiving the pressure pins 116a, 116b. For example, while the figures only show the clamping apparatus 100 from the side of outer gear 110, the opposing side of apparatus 100 may be a mirror image of the view shown in FIG. 3, but including the outer gear 112. In such cases, the pressure pins 116a, 116b may extend from the slots 118a, 118b in the outer gear 110, through the bearing bushings 120a, 120b in the center gear 108, to corresponding slots (not shown) formed in the outer gear 112. In other embodiments, the drive mechanism may include non-roller type pins or slots to drive a cam profile that can generate a loading sufficient to clamp the workpiece 104 using the anvils 106a, 106b.

In embodiments, the clamping apparatus 100 further includes a stabilizing mechanism to minimize, or in some cases, prevent, backlash (e.g., play) during rotation of the gears 108, 110, and/or 112, and to enable precise positioning of the workpiece 104 along an axial center of the clamping apparatus 100. The stabilizing mechanism can include a plurality of shafts 124 that rigidly couple the outer gears 110, 112 to each other. For example, as shown in FIG. 2, each of the shafts 124a, 124b, 124c may be secured on one end to the outer gear 110 and on the other end (not shown) to the outer gear 112. The shafts 124 may be secured to the outer gears 110, 112 using any suitable technique. In a preferred embodiment, the shafts 124 may be piloted or counterbored to the outer gears 110, 112.

In embodiments, the stabilizing mechanism further comprises openings 126a, 126b, 126c in the center gear 108 for slidably receiving a middle portion of the shafts 124a, 124b, 124c, respectively, as shown in FIGS. 4 and 6. Because the shafts 124 are secured to both of the outer gears 110, 112, the shafts 124 may slide within the openings 126 when the outer gears 110, 112 are rotated to perform a clamping or unclamping operation (e.g., while the center gear 108 remains fixed) and/or when the center gear 108 rotates to position the workpiece 104. In embodiments, the openings 126 can be sized and shaped to allow the shafts 124 to move back and forth within the openings 126 (e.g., in the directions 122 and 121) as the outer gears 110, 112 rotate in the directions 122 and 121, without touching the sides of the openings 126, or causing the center gear 108 to move. For example, the openings 126 may be elongated like the slots 118 and wide enough to receive the middle portion of the shafts 124.

By rigidly coupling the outer gears 110, 112 to each other on either side of the center gear 108, the stabilizing mechanism can equalize a load on the pressure pins 116 while the anvils 106 are clamping the workpiece 104. As a result, the center gear 108 may be mechanically loaded on both sides, thereby allowing the center gear 108 to better maintain workpiece positioning.

Figure 7:
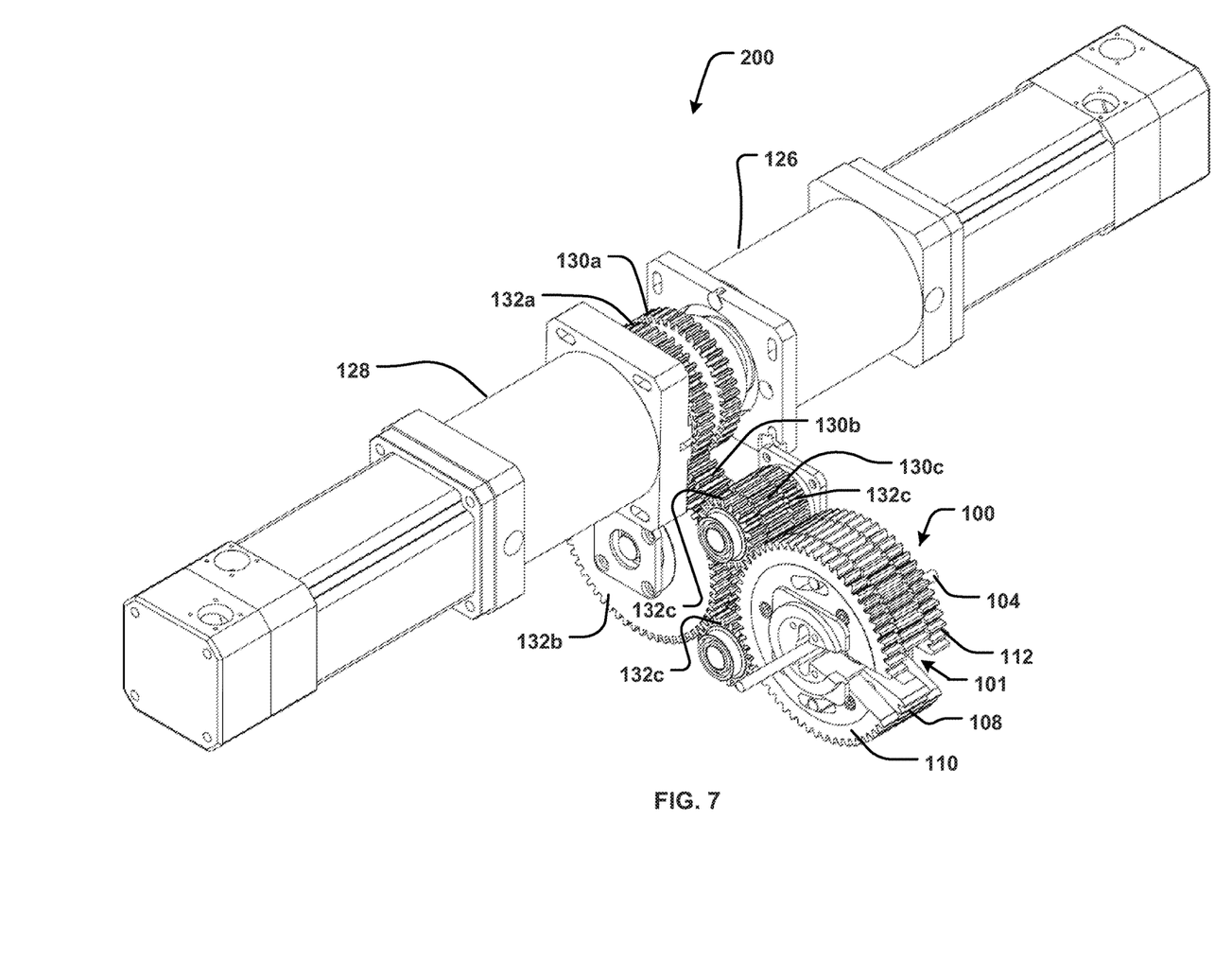
FIG. 7 is a perspective view of a clamp assembly comprising the clamping apparatus shown in FIG. 2 in accordance with embodiments.
Figure 8:
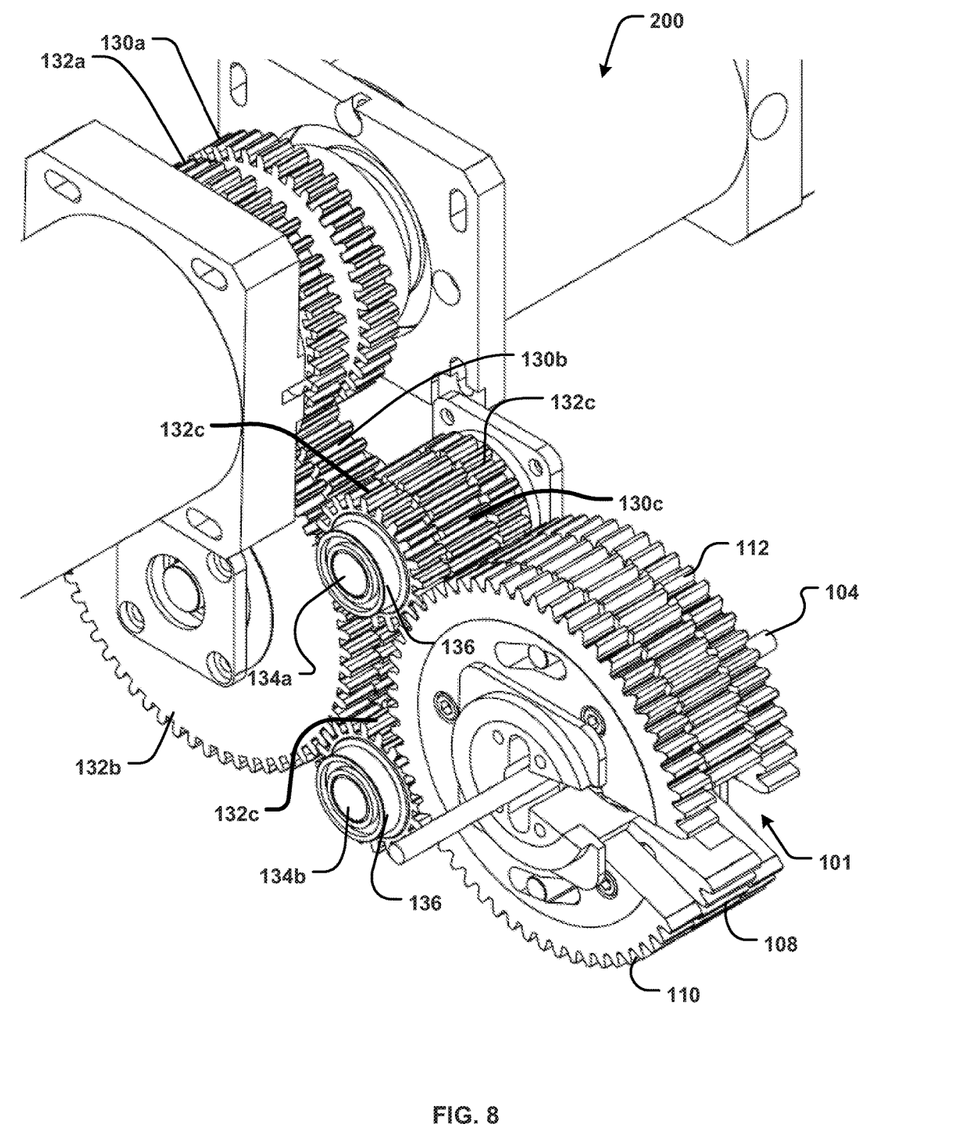
FIG. 8 is an enlarged perspective view of the clamp assembly shown in FIG. 7 in accordance with embodiments.

Referring now to FIGS. 7 and 8, shown is a clamping system 200 comprising the clamping apparatus 100, a positioning device 126 for driving the center gear 108, and a clamping device 128 for driving the outer gears 110, 112, in accordance with embodiments. Each of the positioning device 126 and the clamping device 128 can be configured, for example, using a human machine interface (HMI) (also referred to herein as "user interface") or other computer software, and can include a servo motor or servo gear reducer.

The positioning device 126 and the clamping device 128 can work in conjunction to operate the clamping apparatus 100. In particular, the positioning device 126 can be programmed to position the workpiece 104 at a specified position (e.g., a user-provided position) within the center gear 108. For example, a user operating the HMI may enter a position value in 0.01 degree increments, and in response, the center gear 108 may be rotated to a corresponding position. Further, the clamping device 128 can be programmed for various force requirements, including applying a specified torque limit (e.g., a user-provided torque) to the outer gears 110, 112 during a clamping and/or unclamping operation. As discussed above, the torque applied to the outer gears 110, 112 can be applied as clamping pressure to the anvils 106. In embodiments, the clamping device 128 can work in torque mode to cause the clamping apparatus 100 to apply a constant pressure on the workpiece 104 via the anvils 106 and to allow fine-tuned adjustments to the force or clamping pressure applied by the anvils 106 on the workpiece 104. The clamping device 128 can also be programmed to activate rotation of the outer gears 110, 112 in a first direction (e.g., direction 122) to begin a clamping operation, and to rotate the outer gears 110, 112 in a reverse direction (e.g., direction 121) to deactivate the clamping, or activate an unclamping operation.

The clamping system 200 further includes a positioning gear train 130 that mechanically couples the positioning motor 126 to the center gear 108 of the clamping apparatus 100. The positioning gear train 130 includes a plurality of gears 130a, 130b, 130c that are configured to cause rotation of the center gear 108 without causing rotation of the outer gears 110, 112. For example, as shown in FIG. 8, which includes an enlarged view of gear trains 130, 132 shown in FIG. 7, the positioning device 126 controls gear 130a, which drives gear 130b, which drives gear 130c, and finally, gear 130c drives the center gear 108. Further, gear 130c includes a bearing (not shown) that allows free rotation of the gear 130c by the gear 130b.

The clamping system 200 also includes a clamping gear train 132 that mechanically couples the clamping device 128 to the outer gears 110, 112 of the clamping apparatus 100. The clamping gear train 132 includes a plurality of gears 132a, 132b, 132c, that are configured to cause rotation of the outer gears 110, 112 without causing rotation of the center gear 108. For example, as shown in FIG. 8, the clamping device 128 controls gear 132a, which drives gear 132b, which drives gears 132c, and finally, gears 132c drive the outer gears 110, 112. In the illustrated embodiment, gears 132c include a first pair of gears 132c coupled to the outer gear 110 and a second pair of gears 132c coupled to the outer gear 112. A first or top shaft 134a runs through the top gears 132c in each pair, and a second or bottom shaft 134b runs through the bottom gears 132c in each pair. That is, the shafts 134a, 134b run parallel to each other between the gear 132b and the outer gears 110, 112. The shafts 134 are fixed to the gears 132c, and a bearing 136 is provided inside each of the shafts 134 to allow the gears 132c to rotate freely.

By providing gears 132c in separate top and bottom locations along top and bottom shafts 134a, 134b, the clamping gear train 132 is able to continuously rotate the clamping apparatus 100 even when the open section 101 (also referred to herein as "undriven portion") of the apparatus 100 reaches the gear trains 130, 132. For example, when the open section 101 reaches the bottom row of gears 132c, the top row of gears 132c are still in contact with the outer gears 110, 112, and when the open section 101 reaches the top row of gears 132c, the bottom row of gears 132c are in contact with the outer gears 110, 112.

In other embodiments, the clamping device 128 may include a rotary bi-directional (e.g., air operated or hydraulically operated) geared motor. For example, a regulated pressure may be applied to drive the clamping apparatus 100 in a first direction, and a reverse flow of pressure may be applied to back drive the clamping apparatus 100 in a reverse direction.

It should be emphasized that the above-described embodiments, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and protected by the following claims.

The invention claimed is:

1. A clamping apparatus, comprising:
a generally annular body including an open center configured to receive a workpiece, the annular body including:
 a pair of anvils configured to exert a clamping pressure on the workpiece;
 a center gear comprising at least one adjustable anvil holder coupled to at least one of the anvils;
 at least one pin rotatably coupled to the at least one anvil holder, the at least one pin extending perpendicularly from the center gear;
 a pair of outer gears positioned on either side of the center gear, each of the outer gears comprising at least one slot configured to slidably receive a respective end of the at least one pin; and
 at least one shaft rigidly secured to each of the outer gears and extending through at least one opening in the center gear.

2. The clamping apparatus of claim 1, wherein the at least one slot of each outer gear is configured to form a cam profile configured to guide the at least one pin to a different position as the outer gears rotate.

3. The clamping apparatus of claim 2, wherein changing a position of the pin causes the at least one anvil holder to move vertically relative to the work piece, vertical movement of the at least one anvil holder adjusting the clamping pressure applied to the workpiece.

4. The clamping apparatus of claim 1, wherein the outer gears are configured to rotate independently of the center gear.

5. The clamping apparatus of claim 1, wherein each of the at least one anvil holder includes a bearing bushing to enable rotation of the at least one pin within the at least one anvil holder.

6. A clamping apparatus, comprising:
a pair of adjustable anvils configured to apply a clamping pressure on a workpiece secured between the anvils;
a center gear comprising a pair of anvil holders respectively coupled to the pair of anvils;
a pair of outer gears arranged on either side of the center gear, rotation of the outer gears relative to the center gear causing a linear movement of the anvils along an axis perpendicular to the workpiece;
an open center extending through each of the outer gears and the center gear and configured to receive the workpiece, the anvils being positioned within said open center; and
a stabilizing mechanism configured to maintain a position of the workpiece within the open center during rotation of at least one of the center gear and the outer gears, the stabilizing mechanism comprising:
 at least one shaft rigidly secured on each end to a respective one of the outer gears; and
 at least one opening in the center gear for slidably receiving a middle portion of the at least one shaft.

7. The clamping apparatus of claim 6, wherein the center gear remains fixed during the rotation of the outer gears.

8. The clamping apparatus of claim 6, wherein the outer gears are configured to rotate about the open center.

9. The clamping apparatus of claim 6, wherein the center gear is configured to maintain a position of the workpiece within the open center, and the outer gears are configured to control the clamping pressure applied to the workpiece.

10. The clamping apparatus of claim 6, further comprising a drive mechanism configured to transfer the rotation of the outer gears to the linear movement of the anvils on the center gear, the drive mechanism including:
 at least one pin rotatably coupled to the at least one anvil holder; and
 at least one slot formed in each outer gear and configured to slidably receive a respective end of the at least one pin, the at least one slot in each outer gear forming a cam profile for guiding a movement of the at least one pin as the outer gears rotate.

11. The clamping apparatus of claim 6, wherein rotation of the outer gears in a first direction causes the anvils to clamp the workpiece and rotation of the outer gears in a reverse direction causes the anvils to unclamp the workpiece.

* * * * *